United States Patent
Huckins

(10) Patent No.: US 8,521,134 B2
(45) Date of Patent: *Aug. 27, 2013

(54) PROXIMITY BASED SECURITY PROTOCOL FOR PROCESSOR-BASED SYSTEMS

(71) Applicant: Jeffrey L. Huckins, Chandler, OR (US)

(72) Inventor: Jeffrey L. Huckins, Chandler, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/683,309

(22) Filed: Nov. 21, 2012

(65) Prior Publication Data
US 2013/0078955 A1    Mar. 28, 2013

Related U.S. Application Data

(60) Continuation of application No. 11/481,319, filed on Jul. 5, 2006, now Pat. No. 8,320,881, and a division of application No. 10/631,126, filed on Jul. 31, 2003, now abandoned.

(51) Int. Cl.
*H04W 12/06*    (2009.01)

(52) U.S. Cl.
USPC .......................................................... 455/411

(58) Field of Classification Search
USPC .............. 455/411, 41.2, 558, 41.3, 26.1, 421,
455/39, 550; 370/311, 328; 340/539.23,
340/568.7
See application file for complete search history.

(56) References Cited

U.S. PATENT DOCUMENTS

| | | | |
|---|---|---|---|
| 6,151,493 A * | 11/2000 | Sasakura et al. | 455/421 |
| 6,230,002 B1 | 5/2001 | Floden | |
| 6,871,063 B1 * | 3/2005 | Schiffer | 455/410 |
| 6,983,312 B1 * | 1/2006 | O'Neil | 709/217 |
| 7,009,512 B2 * | 3/2006 | Cordoba | 340/539.23 |
| 7,016,334 B2 * | 3/2006 | Cohen et al. | 370/338 |
| 8,320,881 B2 * | 11/2012 | Huckins | 455/411 |
| 2005/0009469 A1 | 1/2005 | Kotola | |

* cited by examiner

*Primary Examiner* — Melody Mehrpour
(74) *Attorney, Agent, or Firm* — Trop Pruner & Hu, P.C.

(57) ABSTRACT

A security protocol may be implemented on a processor-based system by providing a wireless signal to a handheld device normally carried by the user. If a response is not received, it may be determined that the user is not sufficiently proximate to the device being accessed and that, therefore, the person accessing the device is not authorized. An appropriate security protocol may be implemented as a result.

8 Claims, 5 Drawing Sheets

PROXIMITY BASED SECURITY PROTOCOL FOR PROCESSOR-BASED SYSTEMS

CROSS-REFERENCE TO RELATED APPLICATIONS

This application is a continuation of U.S. patent application Ser. No. 11/481,319 filed Jul. 5, 2006, which issued as U.S. Pat. No. 8,320,881, which is a divisional of U.S. patent application Ser. No. 10/631,126, filed on Jul. 31, 2003, now abandoned.

BACKGROUND

This invention relates generally to processor-based systems.

Processor-based systems may be wired or wireless, portable and less portable. Wired devices may be connected by physical wires to one another and to electrical connections. A portable device may be coupled by wireless signals to other devices and may use a battery as a source of power. Portable processor-based systems include, for example, laptop computers, cellular telephones, handheld devices, and personal digital assistants.

Processor-based systems are subject to two security concerns. The first concern relates to the security of the data actually stored on the processor-based system. The second security concern relates to the potential theft of the processor-based system. Particularly with portable processor-based systems, theft is easy.

Thus, there is a need for better ways to provide security for processor-based systems.

DETAILED DESCRIPTION

Figure 1:
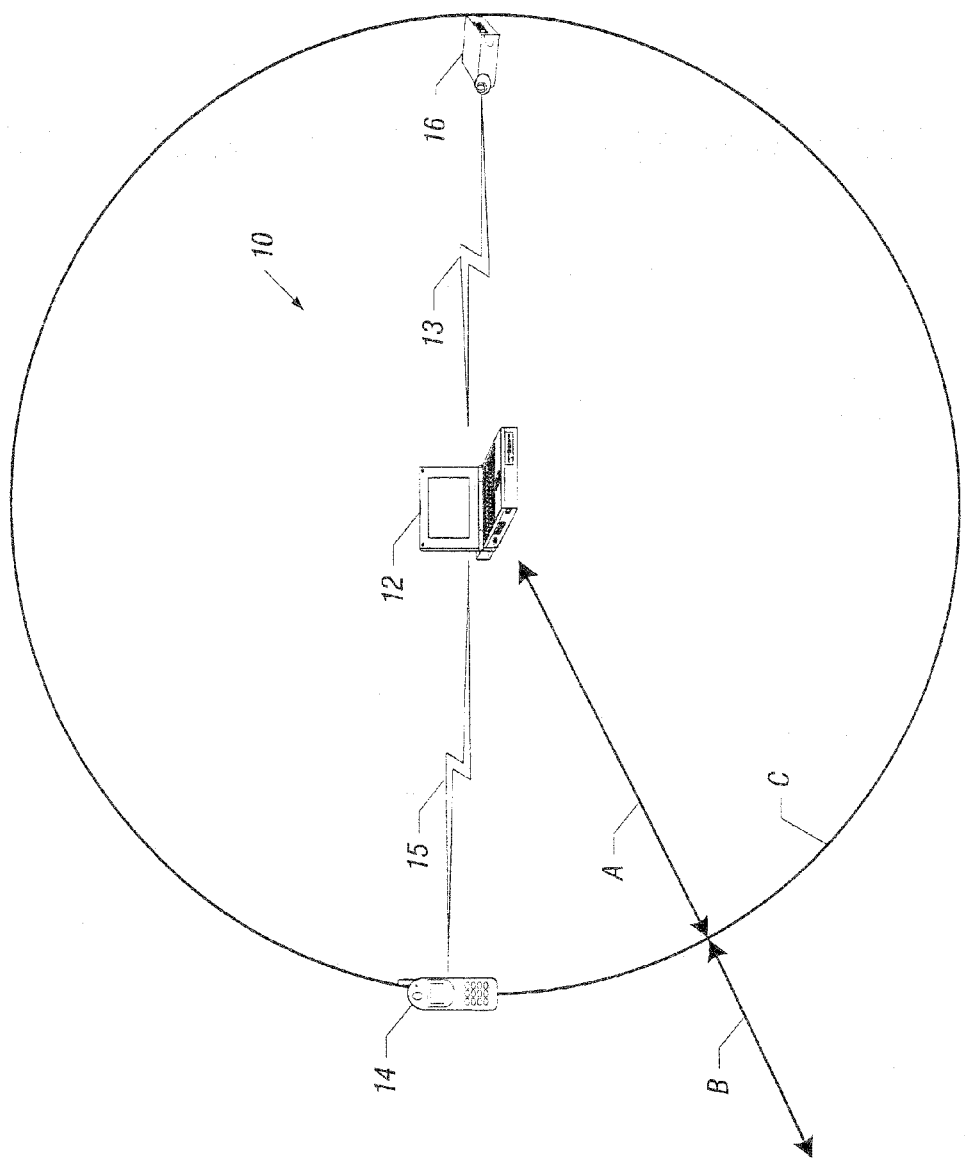
FIG. 1 is a schematic depiction of one embodiment of the present invention.

Referring to FIG. 1, a processor-based device 12 may be associated with a handheld or portable device 14. The processor-based system 12 may be a portable, battery powered device in accordance with one embodiment of the present invention. It may also be capable of wireless communication over one or more wireless protocols. For example, the processor-based system 12 may communicate over a first wireless protocol 15 with a device 14 in the form of a cellular telephone and over a second wireless protocol 13 with an access point 16.

The wireless protocol 15 may be a short range wireless protocol having a range, for example, on the order of about ten feet. One such protocol having such a range is described as the Bluetooth Specification V.1.0B (2003). The range of the protocol 15 is indicated by the arrow A. So long as the handheld device 14 is within the distance A of the processor-based system 12, wireless communication is possible. If the device 14 strays into the region B, wireless communication may no longer be established.

Thus, a network 10 may be formed of the devices 12, 14, and 16, as well as other devices. The range of the wireless network 10 may be limited by the range of the various wireless protocols 13 and 15 that may be utilized.

The processor-based device 12 may be a laptop computer in one embodiment of the present invention. Laptop computers are particularly prone to being stolen. However, the processor-based device 12 may be any processor-based device.

In one embodiment of the present invention, the user may carry the handheld device 14 on his or her person, for example in the user's pocket or it may be held in the user's hand. Thus, the handheld device 14 is closely associated with the location of a user. That same user may own a processor-based system 12. When the user strays beyond the distance A, wireless communication with the processor-based system 12 is discontinued. This may be used as an indication that someone who is attempting to use the processor-based system 12 is unauthorized. Since it can be determined that the authorized user is not proximate to the processor-based system 12, the system 12 may determine that it is not appropriate to allow the person attempting to use the processor-based system to have access. This may provide data security, preventing the unauthorized user from accessing the computer. It may also provide physical security since there is no incentive to steal the processor-based system 12 if it can never be used.

Thus, in one embodiment of the present invention, the system 12 determines whether the user is proximate by attempting to establish wireless communications with the handheld device 14. If such communications are not possible, the processor-based system 12 implements a security protocol that may include denying access, initiating a phone call to the user or others, initiating an alarm, or simply turning the processor-based system 12 permanently off.

Figure 2:
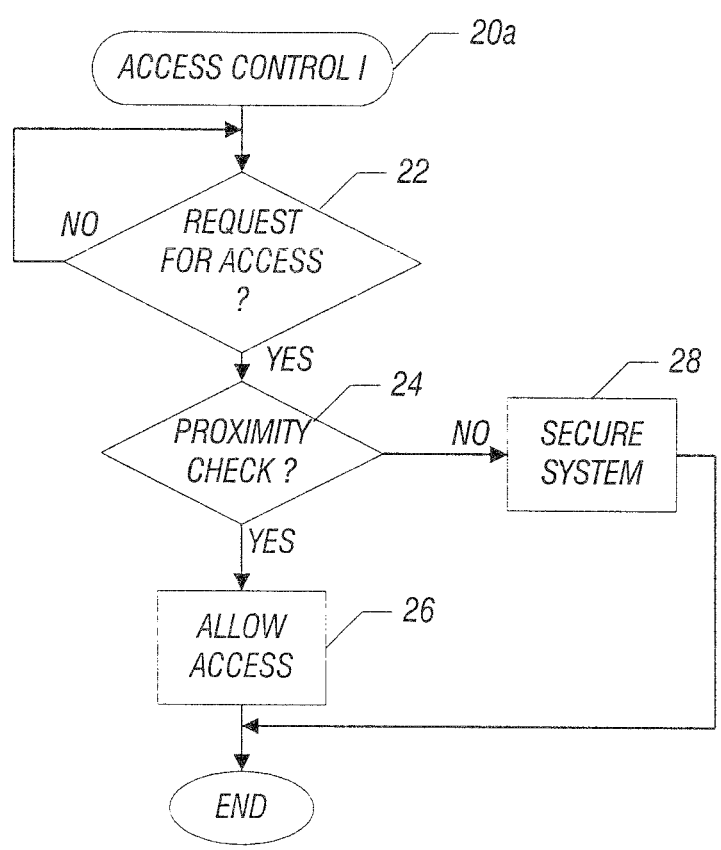
FIG. 2 is a flow chart of a first embodiment of software for securing a processor-based system.

Referring the FIG. 2, in accordance with one embodiment of the present invention, the access control software 20a may be resident on the processor-based system 12. Initially, it determines whether there is a request for access as indicated at diamond 22. If so, a proximity check is implemented as determined in diamond 24. In one embodiment, the proximity check may simply determine whether communication is possible with the handheld device 14. In one embodiment of the present invention, various wireless protocols, such as the Bluetooth protocol, may automatically provide an indication of sufficiently proximate devices and their identifiers. If no such communication can be established with the handheld device 14 normally carried by the user's person, a secure system command 28 may be issued. The secure system command 28 may prevent access, may activate an alarm, may automatically initiate a telephone call to an appropriate entity to provide security, or any of a variety of other actions. If the proximity check is successful, access may be allowed as indicated in block 26.

Figure 3:
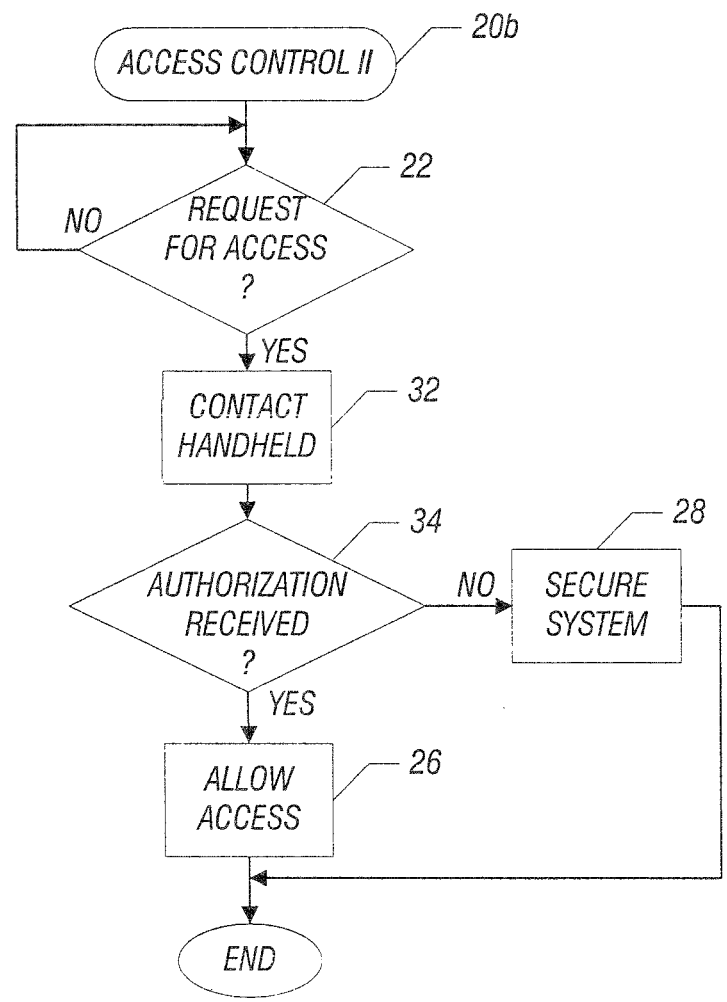
FIG. 3 is a flow chart for a second embodiment for securing a processor-based system.

In accordance with another embodiment of the present invention, shown in FIG. 3, the access control software may also initially receive a request for access as indicated in diamond 22. Upon receiving a request for access, the handheld device 14 may be automatically contacted as indicated in block 32. Only if the authorization code is received from the handheld device 14, as determined in diamond 34, is access allowed, as indicated in block 26. Otherwise the system 12 is secured as indicated in block 28. In some cases, requiring the access protocol may be a more reliable way of ensuring that access is not permitted when the user is not proximate to the access processor-based system 12.

Figure 4:
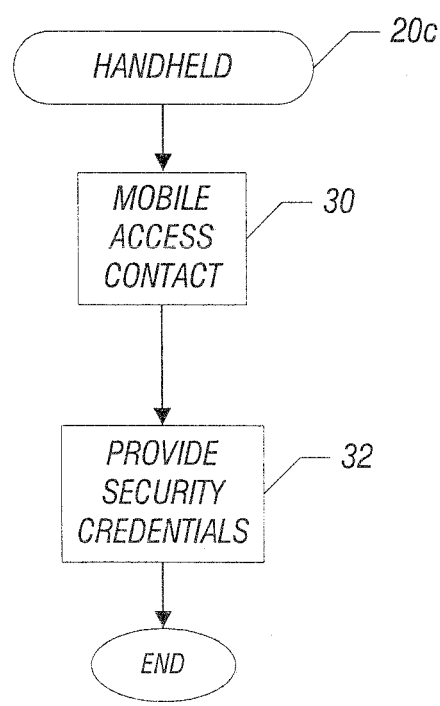
FIG. 4 is a flow chart for a remote or handheld device in accordance with one embodiment of the present invention.

In accordance with one embodiment of the present invention, the handheld device 14 may include the software 22 shown in FIG. 4. When a mobile access contact is implemented, as indicated at block 30, an authentication protocol is implemented. If the access contact is the remote processor-based system 12, security credentials may be provided as indicated in block 32. Of course, if the handheld device 14 is outside the wireless range of the processor-based system 12, the security credentials will never be received and, therefore, access will not be permitted.

In another embodiment, a distance measurement solution may be used. For example, a signal strength indication (SSI) may be used to determine whether the user is farther from the system 12 than a predetermined distance.

Figure 5:
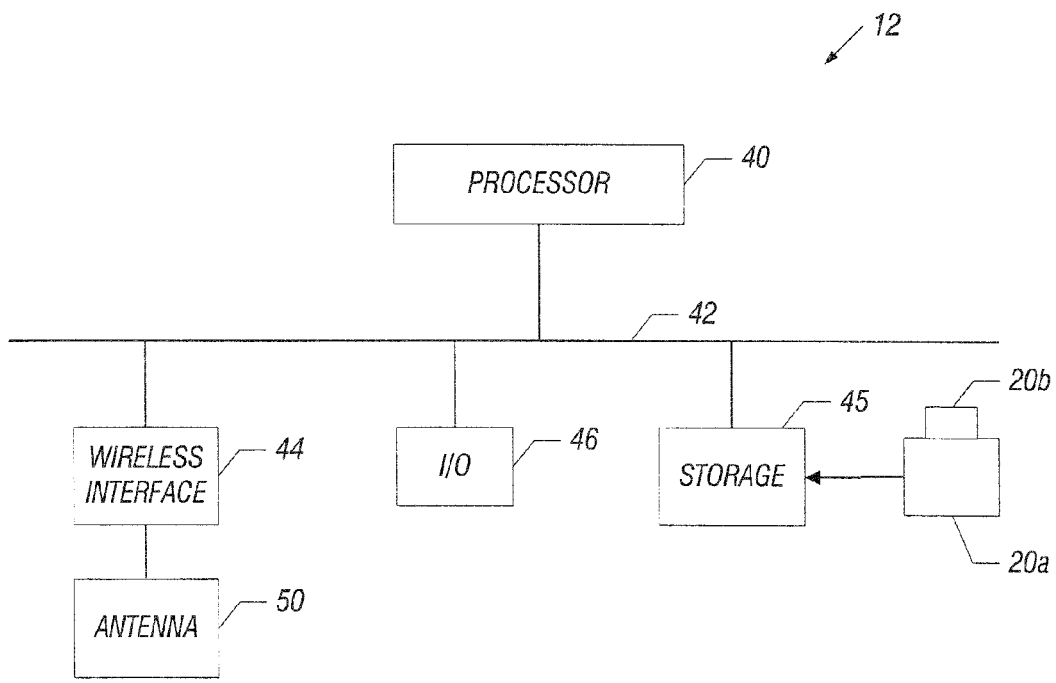
FIG. 5 is a schematic depiction of a processor-based system to be secured in accordance with one embodiment of the present invention.

Referring to FIG. 5, one exemplary architecture for the processor-based system 12 is illustrated. Of course, any other architecture may be utilized as well. In the illustrated architecture, the processor 40 is coupled by a bus 42 to an input/output device 46. A wireless interface 44 may implement one or more appropriate wireless protocols, including a short range wireless protocol, such as the Bluetooth protocol. The wireless interface may be coupled to an antenna 50 such as a dipole antenna.

The bus 42 may also be coupled to a storage device 45 and in one embodiment of the present invention may be a hard disk drive and in another embodiment of the present invention may be a semiconductor memory. The storage 45 may store the access control software 20*a* and 20*b*.

Figure 6:
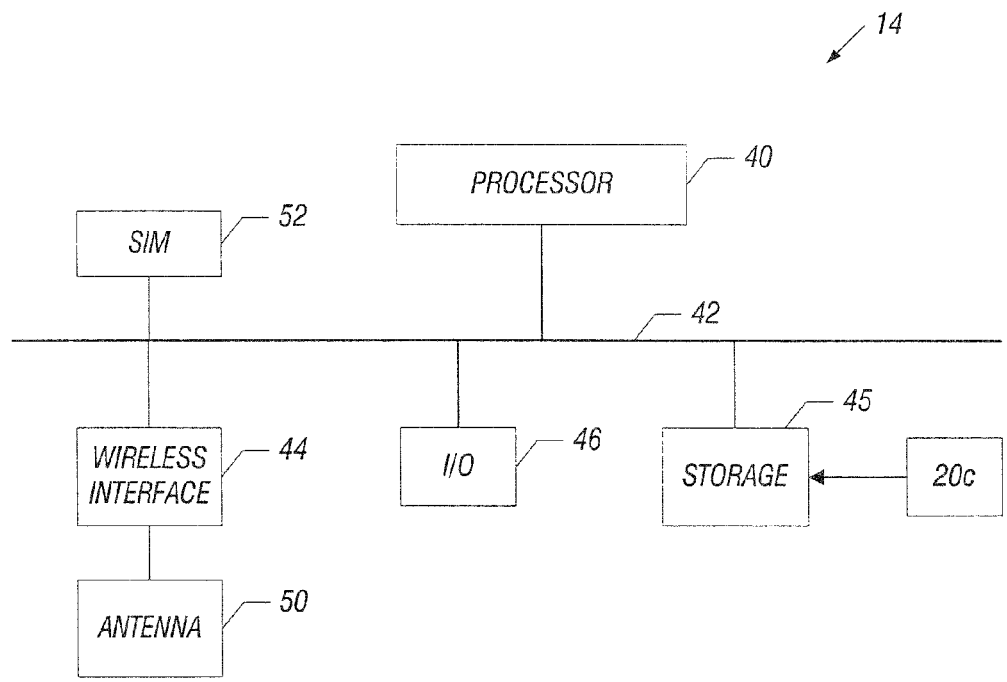
FIG. 6 is a schematic depiction of a remote or handheld device in accordance with one embodiment of the present invention.

Referring to FIG. 6, the handheld device 14 may have the exemplary architecture illustrated. As mentioned above, the architecture illustrated is only one example of a potential architecture for implementing the handheld device 14. In this embodiment, a processor 40 is coupled through a bus 42 to the wireless interface 44 and the input/output device 46. The antenna 50 is coupled to the interface 44. The storage device 45 may store the software 20*c* in one embodiment of the present invention. The storage device 45 may be a semiconductor memory such as a flash memory. However, it can also be any other type of non-volatile storage including a hard disk drive.

Any suitable authentication protocol on the processor-based device 12 and the handheld device 14 may be utilized for exchanging credentials. As an example, an 802.1X supplicant on a handheld device 14 and an 802.1X authenticator on the processor-based system 12 may be used to exchange credentials using the Bluetooth personal area network (PAN) profile. For example, the 802.1X protocol may be the IEEE 802.11 protocols currently specified or their successors. See IEEE 802.11 (1999) specification available from IEEE, New York, New York (ISBN 0-7381-2315-3; Product No.: SH94842-TBR). Security credentials may be stored on the handheld device 14 and a subscriber information module (SIM) 52 to perform the 802.1X authentication of user and processor-based system 12 to the network 10. In this way, a single SIM 52 in the user's handheld device 14 serves multiple functions, including user authentication to the handheld device by a personal identification number protected access, user and handheld device authentication to the processor-based system 12, user and processor-based system 12 authentication to a network 10, for example via 802.1X, and verification of user possession of the processor-based system 12. An 802.1X supplicant on the processor-based system 12 may then use these credentials to respond to an 802.1X authentication protocol from an 802.11 access point 16.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   initiating from a computer system a short range wireless communication link to a cellular telephone from the computer system;
   authenticating a user of the cellular telephone as an authorized user of the computer system using credential information stored in a cellular telephone, the credential information transmitted from the cellular telephone to the computer system using the wireless link initiated by the computer system; and
   monitoring in the computer system the wireless link while receiving the credential information from the cellular telephone to determine in the computer system if the wireless link was interrupted.

2. The method of claim 1 including storing the credential information in a portable identification module.

3. The method of claim 2 wherein the portable identification module is a subscriber information module.

4. The method of claim 1 including determining, based on signal strength, if the computer system is farther from a predetermined distance from the cellular telephone and, if so, initiating an alarm.

5. A computer system comprising:
   a transceiver; and
   a processor to initialize a short range wireless communication link between the computer system and a cellular telephone, authenticate a user of the cellular telephone as an authorized user of the computer system using credential information stored in a the cellular telephone, the credential information transmitted from the cellular telephone using the wireless link, and monitor the wireless link while the credential information is passed between the cellular telephone and the computer system to determine if the wireless link was interrupted.

6. The computer system of claim 5 including storing the credential information in a portable identification module.

7. The computer system of claim 6 wherein the portable identification module is a subscriber information module.

8. The computer system of claim 5 including determining, based on signal strength, if the computer system is farther from a predetermined distance from the cellular telephone and, if so, initiating an alarm.

* * * * *